Aug. 22, 1933.  F. T. NESBITT  1,923,581
LEER
Filed March 7, 1927  2 Sheets-Sheet 1
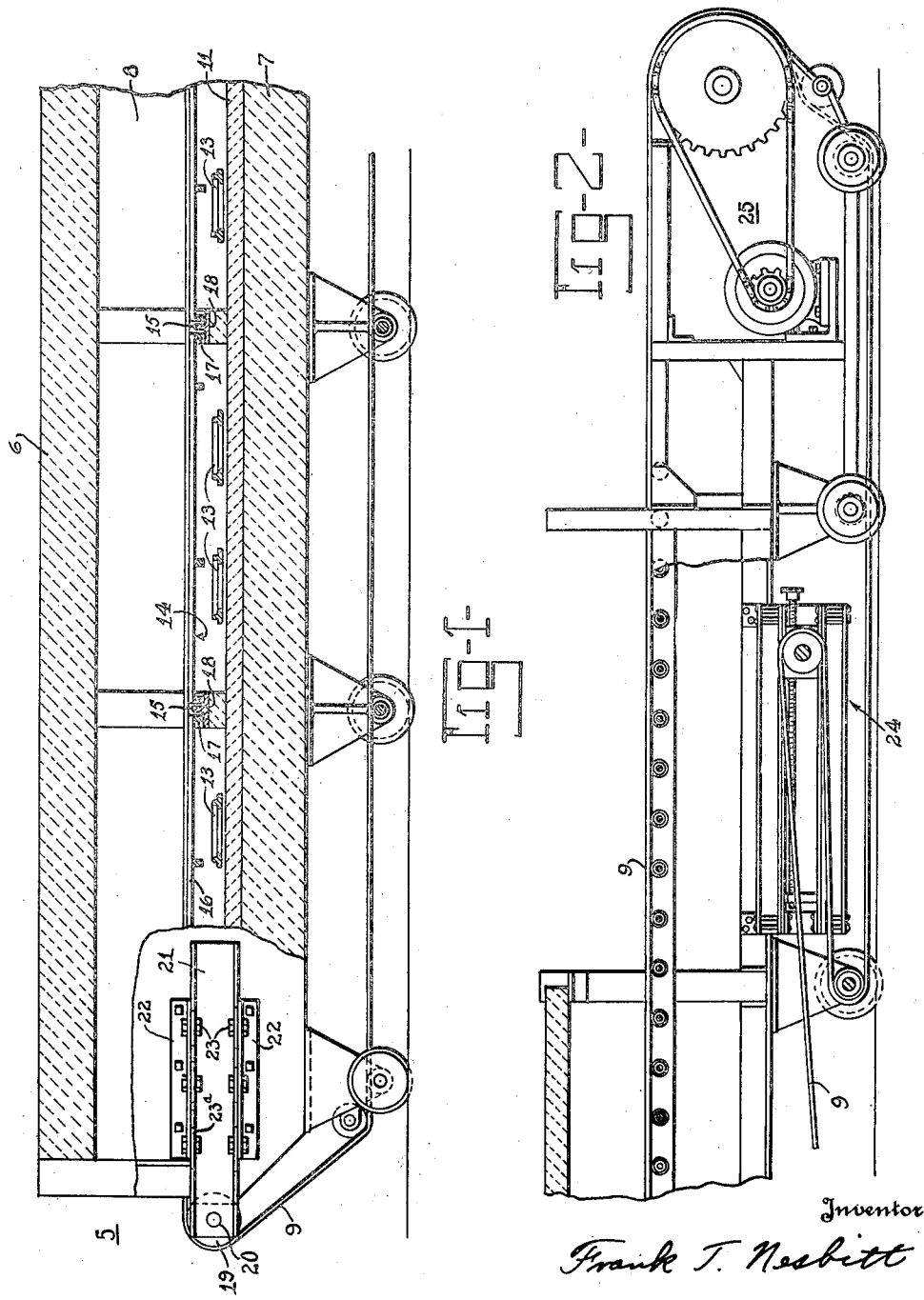
Inventor
Frank T. Nesbitt
By J. F. Rule
Attorney Aug. 22, 1933.        F. T. NESBITT        1,923,581
LEER
Filed March 7, 1927        2 Sheets-Sheet 2
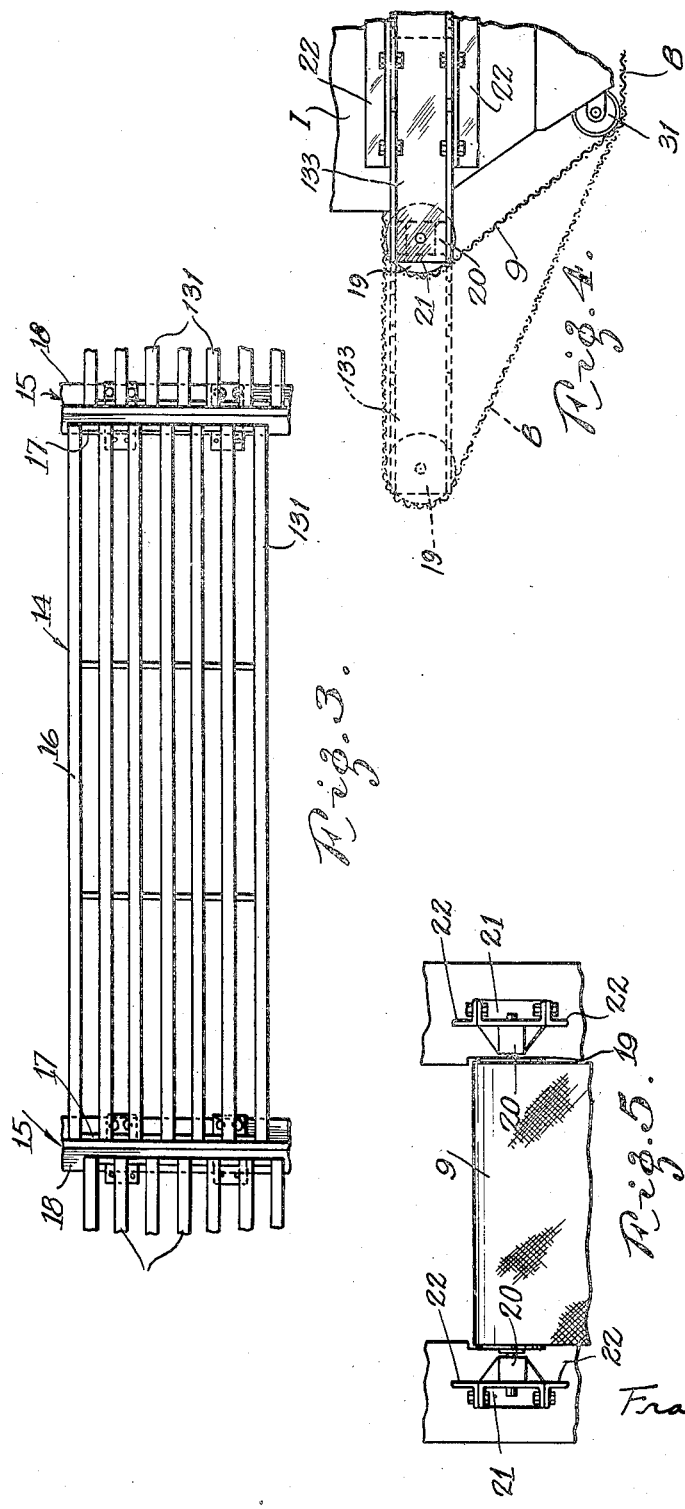

Patented Aug. 22, 1933

1,923,581

UNITED STATES PATENT OFFICE 1,923,581

LEER

Frank T. Nesbitt, Alton, Ill., assignor, by mesne assignments, to Owens-Illinois Glass Company, Toledo, Ohio, a Corporation of Ohio Application March 7, 1927. Serial No. 173,369

6 Claims. (Cl. 49—47)

This invention relates to leers and with regard to certain more specific features, to glass annealing leers of the electrically heated type.

More particularly, the invention is concerned with open fired leers in which heat is transferred directly from the heating elements to the articles being annealed. In this form of leer a wire mesh leer conveyor or belt moves continuously through a horizontal tunnel over an open or perforate support beneath which suitable heating elements are arranged. Generally, the means for supporting the leer conveyor is such that it contacts the lower side of the conveyor only at points spaced apart transversely of the length of the latter. This results in an uneven distribution of wear and consequent unnecessary shortening of the life of the conveyor.

An object of the present invention is the provision of means for uniformly distributing such wear over the entire lower surface of the conveyor. To this end the supporting means is such that the entire lower surface of the leer conveyor is engaged thereby, this being accomplished without interfering materially with free upward movement of the heat into contact with the articles being carried through the leer.

Another object of the invention is the provision of novel means for effecting sufficient cooling of the articles prior to their being placed in the leer tunnel to insure against collapse thereof when they are subjected to the intense heat at the receiving end of the leer. To this end a platform exterior to the leer tunnel is provided at the receiving end of the leer upon which bottles to be annealed are initially placed and by which they are carried into the tunnel. In accomplishing this, the leer conveyor is extended forwardly beyond the receiving end of the tunnel thereby providing a continuously moving platform upon which the articles to be annealed are to be placed and by which they are carried into the leer.

Another object is the provision of means for shortening or lengthening this receiving platform so that the period of time during which articles supported thereon are exposed to the outside air for cooling may be regulably controlled and compensate for variations in the size of the articles being treated.

Other objects will be in part apparent and in part pointed out hereinafter.

In the accompanying drawings:

Fig. 1 is a part sectional side elevational view of the front end portion of a standard form of leer embodying the present invention.

Fig. 2 is a sectional elevational view of the delivery end of the leer.

Fig. 3 is a plan view of the leer conveyor support.

Fig. 4 is a detail side elevational view of the receiving end of the leer.

Fig. 5 is a fragmentary front elevational view of the parts shown in Fig. 4.

Corresponding reference characters indicate corresponding parts throughout the several views of the drawings.

The present invention is illustrated in connection with a conventional form of open fired continuous leer consisting of a horizontal open ended tunnel 5 made up of insulated top and bottom walls 6 and 7 respectively, and opposed vertical side walls 8. An endless conveyor 9 of the open wire mesh or reticulated type, extends through the tunnel 5 in spaced relation to the floor 11. Between the ware supporting reach 12 of the conveyor and said floor, there is arranged a series of electric heating elements 13. A conveyor support 14 for the ware supporting reach of the leer conveyor 12, is spaced a short distance above the floor 11 and consists of a plurality of grids. These grids have their ends resting upon transverse T-irons 15 which extend across the leer tunnel at points spaced apart uniformly along the leer. Each grid consists of a plurality of parallel bars 16 extending lengthwise of the leer tunnel and secured together by cross members 17, certain of the latter supported on the base flanges 18 of the T-irons 15 referred to above. It will be observed in Fig. 3 that alternate grids are offset relative to each other transversely of the length of the leer so that the supporting bars 16 of any two adjacent grids have supporting engagement with different portions of the leer conveyor. In this manner uneven wear of the conveyor is avoided or at least greatly reduced.

In order that a cooling platform may be provided at the receiving end of the leer for the purpose set out heretofore, the following structure is employed. The leer conveyor 9 at the receiving end of the leer is carried over an idler roll 19 which is journaled in bearings 20 at the outer end of a pair of horizontal arms 21. These arms which are in the form of channel bars extend along the exterior surface of the opposed vertical side walls 8 and are supported between pairs of vertically spaced horizontal angle irons 22, the latter suitably attached to said side walls. Bolts 23 and slots 23ª provide connection between the arms 21 and said angle irons 22, and permit adjustment of said arms whereby the supporting area of the external platform and consequently the period of exposure of articles to the outside air may be varied. A conveyor tightener 24 at the delivery end of the leer provides means whereby the length of the ware supporting reach of the conveyor and, therefore, the length of the cooling platform, may be changed within certain limits. Suitable driving mechanism 25 for imparting motion to the conveyor is provided at the delivery end of the leer. Fig. 4 illustrates two of the adjusted positions which the idler roll 19 may assume in providing a suitable platform for receiving articles of glassware intended to be cooled prior to their entry into the leer tunnel.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A glassware annealing leer comprising an annealing chamber having a ware receiving opening at one end, a conveyor extending through the chamber and outwardly beyond said receiving opening providing a moving platform exterior to the chamber, and means for varying the spaced relation between said receiving opening and the opposite end of the platform to thereby correspondingly vary the period of time during which glass articles placed on said platform are exposed to the atmosphere for natural cooling prior to their entering the chamber.

2. A glassware annealing leer comprising an annealing chamber having a ware receiving opening at one end, an endless leer conveyor extending through the chamber and outwardly beyond the opening, an idler roll adjacent the receiving opening over which the conveyor is trained, and means for adjusting said roll horizontally with respect to the receiving opening to thereby form a moving platform exterior to the leer chamber whereby glass articles deposited on the platform may be naturally cooled a predetermined variable extent prior to their entry into the annealing chamber.

3. A glassware annealing leer comprising an elongated tunnel, an endless reticulated conveyor belt having a ware supporting reach extending through the tunnel, and a support for the conveyor belt including a longitudinal series of supporting bars, alternate bars of the series being offset horizontally with regard to the other bars whereby adjacent bars of the series have supporting engagement with different portions of the conveyor belt.

4. A leer comprising a horizontally disposed tunnel, a reticulated conveyor belt having a ware supporting reach extending through the tunnel, and a longitudinal series of supporting devices arranged within the tunnel in supporting engagement with the lower side of said reach of the conveyor belt, alternate supporting devices of the longitudinal series being offset horizontally and transversely of the tunnel with respect to the other supporting devices to thereby distribute wear over substantially the entire adjacent surface of the conveyor belt.

5. A glassware annealing leer comprising an elongated tunnel, an endless conveyor belt having a ware supporting reach extending through the tunnel, and a support for the conveyor belt including a longitudinal series of supporting bars, alternate bars of the series being offset horizontally with respect to the other bars whereby adjacent bars of the series have supporting engagement with different portions of the conveyor belt.

6. A leer comprising a horizontally disposed tunnel, an endless conveyor belt having a ware supporting reach extending through the tunnel, and means for supporting said reach of the conveyor belt including a longitudinal series of open frames, each frame consisting of a series of bars extending lengthwise of the tunnel and spaced apart transversely thereof, adjacent frames being offset horizontally with regard to each other whereby the bars of adjacent frames have supporting contact with different portions of the conveyor belt.

FRANK T. NESBITT.